(12) United States Patent
Denu et al.

(10) Patent No.: US 9,610,982 B2
(45) Date of Patent: Apr. 4, 2017

(54) FENDER MOUNTING ARM

(71) Applicant: Fontaine Spray Suppression Company, Springfield, TN (US)

(72) Inventors: Kyle Denu, Hendersonville, TN (US); Helbert Flores, Goodlettsville, TN (US)

(73) Assignee: Fontaine Spray Suppression Company, Springfield, TN (US)

( * ) Notice: Subject to any disclaimer, the term of this patent is extended or adjusted under 35 U.S.C. 154(b) by 53 days.

(21) Appl. No.: 14/789,575

(22) Filed: Jul. 1, 2015

(65) Prior Publication Data

US 2016/0001821 A1    Jan. 7, 2016

Related U.S. Application Data

(60) Provisional application No. 62/019,697, filed on Jul. 1, 2014.

(51) Int. Cl.
*B62D 25/16* (2006.01)

(52) U.S. Cl.
CPC ................... *B62D 25/166* (2013.01)

(58) Field of Classification Search
CPC ...... B62D 25/16–25/163; B62D 25/166; B62D 25/168; B62D 25/18; B62D 25/182–25/184; B62D 25/188
See application file for complete search history.

(56) References Cited

U.S. PATENT DOCUMENTS 4,377,294 A * 3/1983 Lockwood ............ B62D 25/16
                                                              280/851

* cited by examiner

*Primary Examiner* — Erez Gurari
(74) *Attorney, Agent, or Firm* — Andrus Intellectual Property Law, LLP

(57) ABSTRACT

An arm for mounting a fender to a vehicle includes a shell defining an internal channel. The shell features a proximal end portion and a distal end portion. A mounting plate is secured within the internal channel in the proximal end portion of the shell. The mounting plate includes a fastener opening, which receives a fastener to secure the arm to a vehicle. The distal end portion of the shell is adapted to be fastened to the fender.

18 Claims, 6 Drawing Sheets

FENDER MOUNTING ARM

CROSS REFERENCE TO RELATED APPLICATIONS

This application claims priority to U.S. Provisional Patent Application No. 62/019,697, filed Jul. 1, 2014, the entire contents of which are hereby incorporated by reference.

FIELD OF THE INVENTION

The present invention relates generally to accessories for vehicles and, in particular, to an arm for mounting fenders to vehicles.

BACKGROUND

A heavy duty semi or tractor truck typically features a pair of front wheels, which are used to steer the vehicle, and at least one pair of rear drive wheels connected by a drive axle. The drive axle is driven by the truck engine to propel the vehicle. Most semi or tractor trucks feature a pair of rear drive axles in a tandem arrangement, with two drive wheels mounted at each end of each axle.

Fenders are often positioned in front of, over and/or behind the truck drive wheels to guard against mud and other debris that may be thrown by the drive wheels when the truck is in use. As a result, the fenders help keep the cab, trailer and remaining portions of the truck clean and protect against damage or injury from flying stones and the like. The fenders may also protect surrounding vehicles and other objects from flying debris. In addition, the fenders may be chromed or otherwise finished to provide a custom look to the truck.

Semi or tractor truck fenders typically come in half tandem, full tandem, quarter fender or single axle styles. In each instance, the fender must be secured to the truck frame in proximity to the drive wheels. A variety of mounting options have been used in the prior art. For example, a common arrangement involves mounting a support post or tube to the truck frame or other component to support each fender, where the support post or tube extends horizontally outwards from the truck frame. The fender includes a tube clamp that slides on top of the support post or tube and is tightened to secure the fender in place next to or over the corresponding drive wheel(s). Another option has been to weld a mounting arm onto a base plate and to bolt the base plate to the truck frame or other component. The fender is then attached to the mounting arm.

A need exists, however, for a mounting arm that simplifies and facilitates installation of fenders on vehicles while providing an improved finished appearance for the installation.

DETAILED DESCRIPTION OF EMBODIMENTS

Figure 1:
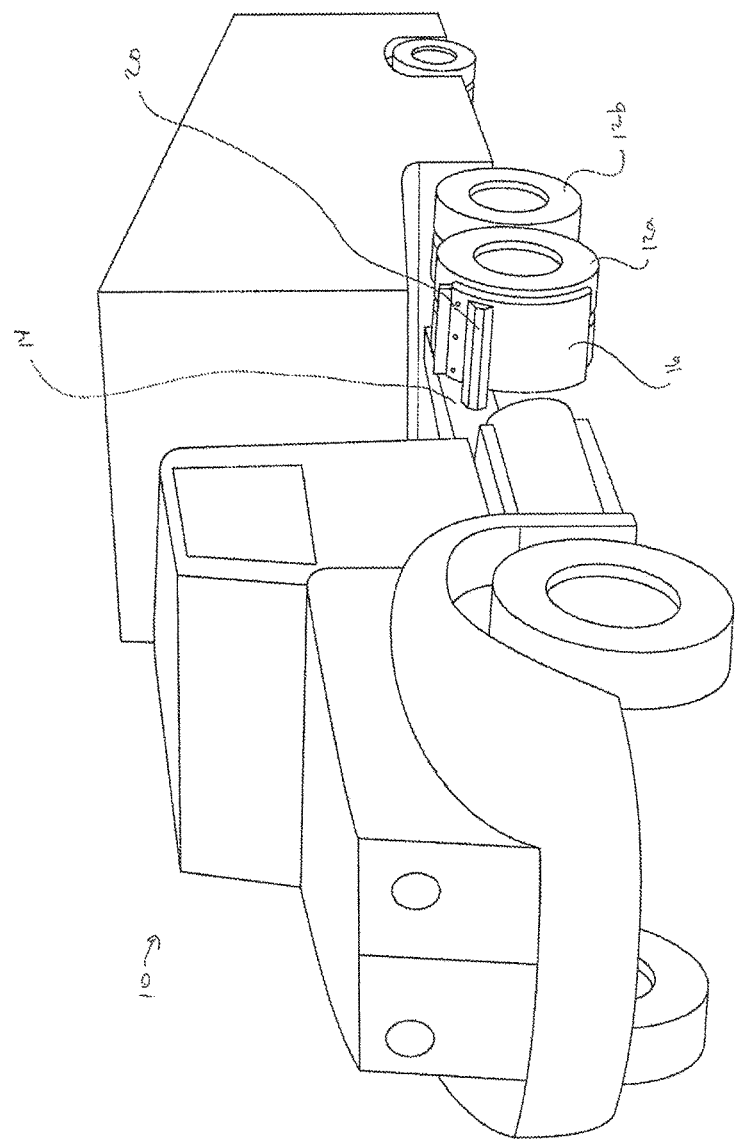
FIG. 1 is a front perspective view of a semi or tractor truck to which a quarter fender has been mounted using an embodiment of the fender mounting arm of the present invention.

A semi or tractor truck provided with a quarter fender using an embodiment of the fender mounting arm of the present invention is indicated in general at 10 in FIG. 1. More specifically, the truck features tandem rear drive wheels 12a and 12b which support the truck frame 14. A quarter fender 16 is mounted to the frame 14 in a position forward or in front of drive wheels 12a via an embodiment of the fender mounting arm of the present invention, indicated at 20. The quarter fender 16 blocks and deflects debris that is sprayed or otherwise thrown by the drive wheels 12a while the truck is in use.

While the invention is described below in terms of mounting a quarter fender to the frame of a heavy duty semi or tractor truck, it is to be understood that the invention may be used to mount half tandem, full tandem, single axle and other styles and types of fenders or the like to alternative types of vehicles and vehicle components.

Figure 2:
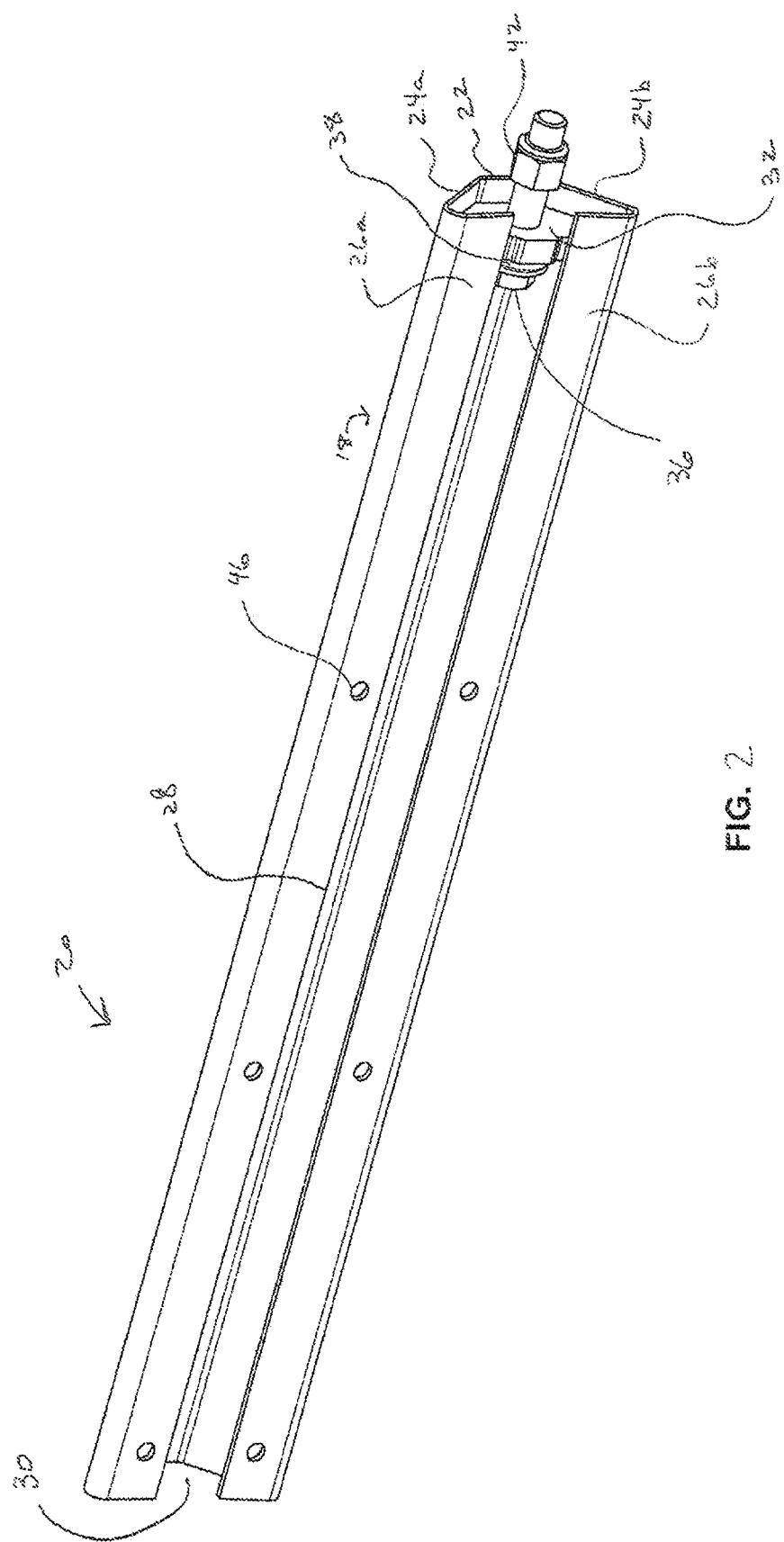
FIG. 2 is a rear perspective view of an embodiment of the fender mounting arm of the present invention with a primary mounting bolt positioned therein.
Figure 3:
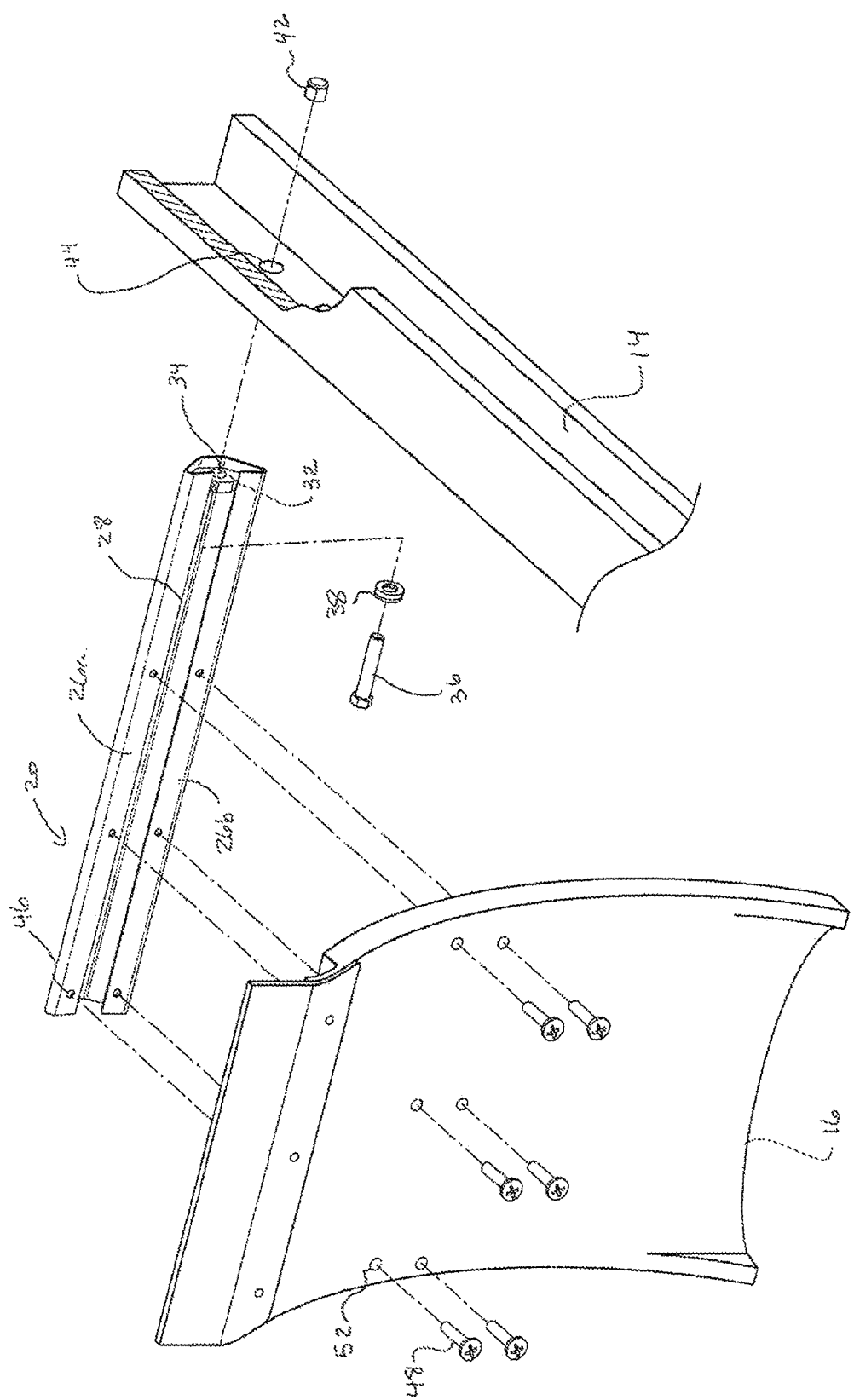
FIG. 3 is an exploded rear perspective view of the fender mounting arm and primary mounting bolt of FIG. 2, the quarter fender of FIG. 1 and fender fasteners.

Enlarged views of the fender mounting arm 20 are provided in FIGS. 2 and 3. As illustrated in FIG. 2, the arm 20 features a shell portion, indicated in general at 18. Shell 18 includes a center panel 22, a pair of wing panels 24a and 24b and a pair of inwardly turned flange panels 26a and 26b. The flange panels 26a and 26b are spaced so that a longitudinal slot 28 is formed. The flange panels 26a and 26b are positioned in a plane that is generally parallel to the plane of center panel 22, while the wing panels 24a and 24b form acute angles with respect to the flange panels 26a and 26b and obtuse angles with respect to opposing sides of the center panel 22. As a result, the arm generally features a truncated triangular cross section and defines an interior channel or passage 30. It is to be understood that alternative shapes may be used for the arm, as long as an interior channel or passage is provided. The arm 20 is preferably formed from steel, but other rigid or semi-rigid materials may be used.

A mounting tab or plate 32 features a shape corresponding to the cross sectional shape of the channel 30 of the arm and is welded by its peripheral edges to the interior surfaces of the center panel 22, wing panels 24a and 24b and flanges 26a and 26b. As a result, the mounting plate increases the structural integrity of the mounting arm. The mounting plate may alternatively be held in place by an adhesive or other fastening arrangement known in the art.

As illustrated in FIG. 3, the mounting plate 32 is provided with a fastener opening 34 which, as illustrated in FIGS. 2 and 3, receives a primary mounting fastener, such as threaded bolt 36. Bolt 36 is preferably provided with a spherical washer 38 and has a threaded shaft that is received within the opening of a nut 42. Nut 42 may be, for example, a hex nut with a nylon retaining patch such as is available from Nylok LLC of Macomb, Mich. Other fasteners known in the art may be substituted for bolt 36, washer 38 and nut 42.

The mounting plate 32 is preferably mounted slightly inset from the proximal end of the shell 18 of the arm 20, as shown in FIGS. 2 and 3. Alternatively, the mounting plate 32 may be mounted within the channel 30 and flush with the proximal end of the mounting arm.

Figure 5:
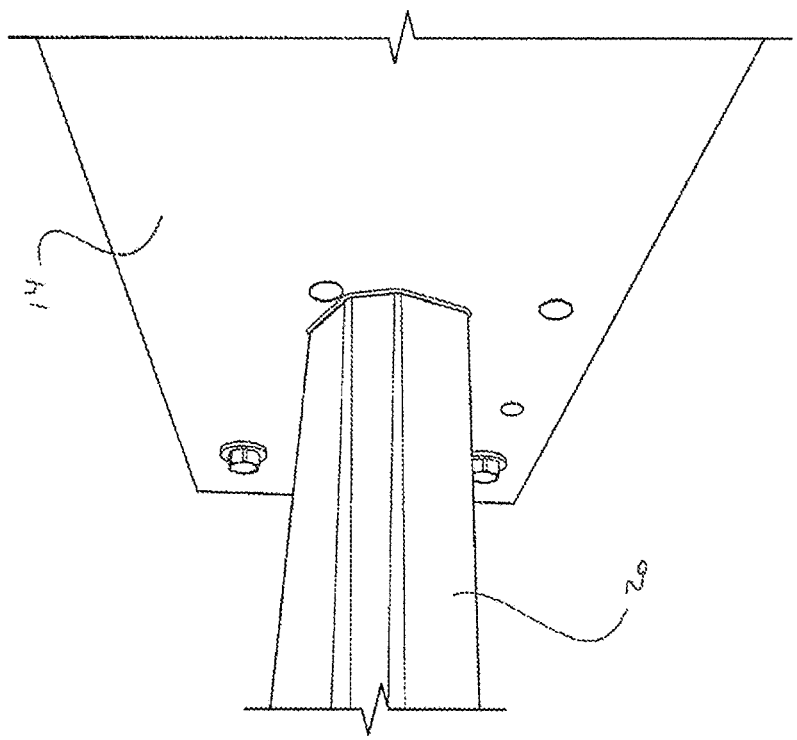
FIG. 5 is a front perspective view of the proximal portion of the mounting arm and the portion of the truck frame of FIG. 4.
Figure 4:
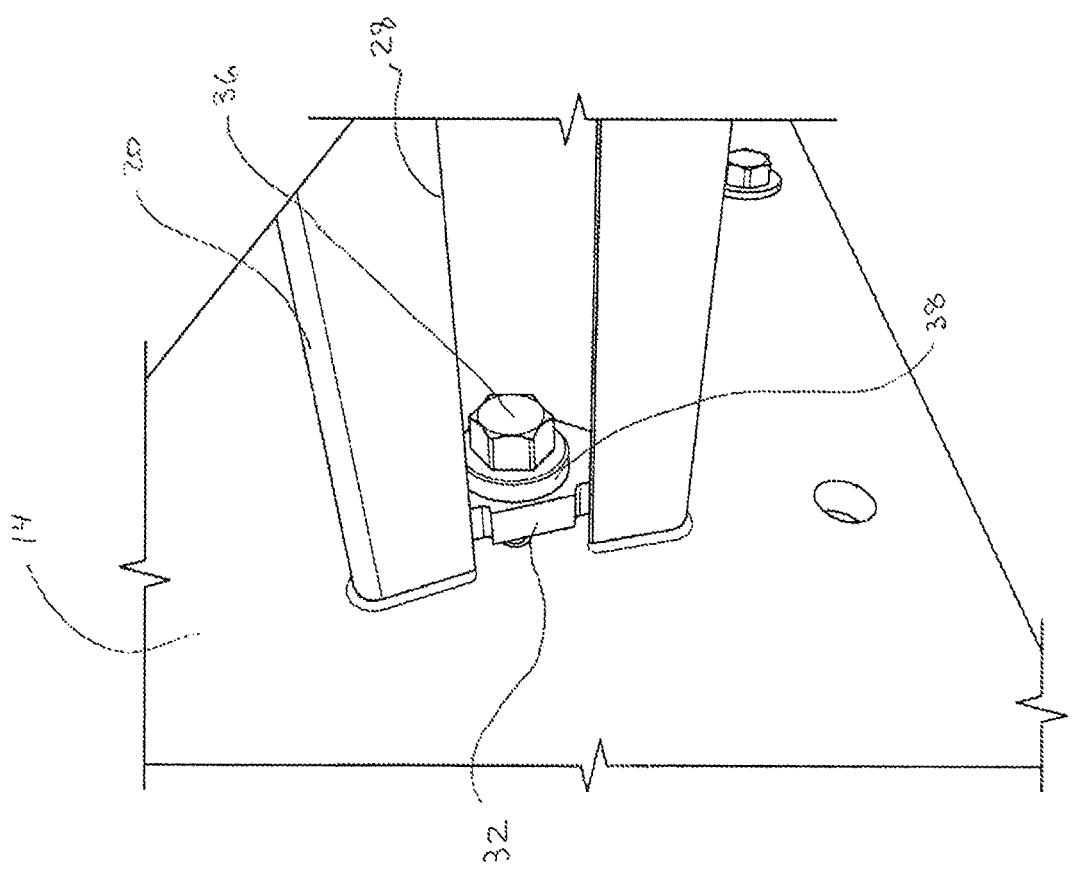
FIG. 4 is a rear perspective view of a proximal portion of the mounting arm of FIGS. 1-3 and a portion of the frame of the truck of FIG. 1 with the mounting arm attached thereto.

Installation of the mounting arm and a quarter fender are illustrated in FIGS. 3-5. The proximal end of the arm 20 is positioned adjacent to an outer side of the truck frame 14 with fastener opening 34 of the mounting plate 32 aligned with an opening 44 (FIG. 3) formed in the truck frame. Preferably opening 44 is a standard, pre-existing opening provided in the truck frame. Primary mounting bolt 36 is then inserted through the mounting plate opening 34 and the truck frame opening 44 (after the washer 38 is installed on the bolt). Nut 42 is next installed onto the threaded shaft of bolt 36 and tightened so that the arm 20 is secured to the truck frame 14. The longitudinal slot 28 of the mounting arm permits the head of the bolt 36 to be accessed by a tool during tightening of the bolt. The internal mounting plate 32 allows the proximal end of the arm to mount flush against the truck frame using a single bolt so that the truncated triangular appearance of the arm extends all of the way to the truck frame. This provides the installation with an attractive finished appearance.

As illustrated in FIGS. 2 and 3, the flange panels 26a and 26b of the mounting arm are provided with fender fastening openings 46 in the distal end and middle portions of the shell 18. Fender fasteners, such as screws 48 (FIG. 3) are sized to pass through openings 52 formed in the fender 16 and engage corresponding fender fastening openings 46. As a result, the fender 16 is attached to the arm 20, with the fender abutting flange panels 26a and 26b of the arm, as illustrated in FIG. 1. Alternative fasteners known in the art may be used in place of screws 48. In addition, the fender 16 may alternatively be attached to the mounting arm 20 prior to attachment of the arm to the truck frame 14.

The embodiment of the fender mounting arm described above therefore eliminates the more complex post mount/tube clamp arrangement of the prior art and bolts directly to the truck frame (or other component) so as to eliminate the unsightly base plate and corresponding welds at the proximal end of the arm. Furthermore, due to the single-bolt installation, the installer has the freedom to easily install the fender to the frame of the truck at his desired location and angle.

Figure 6:
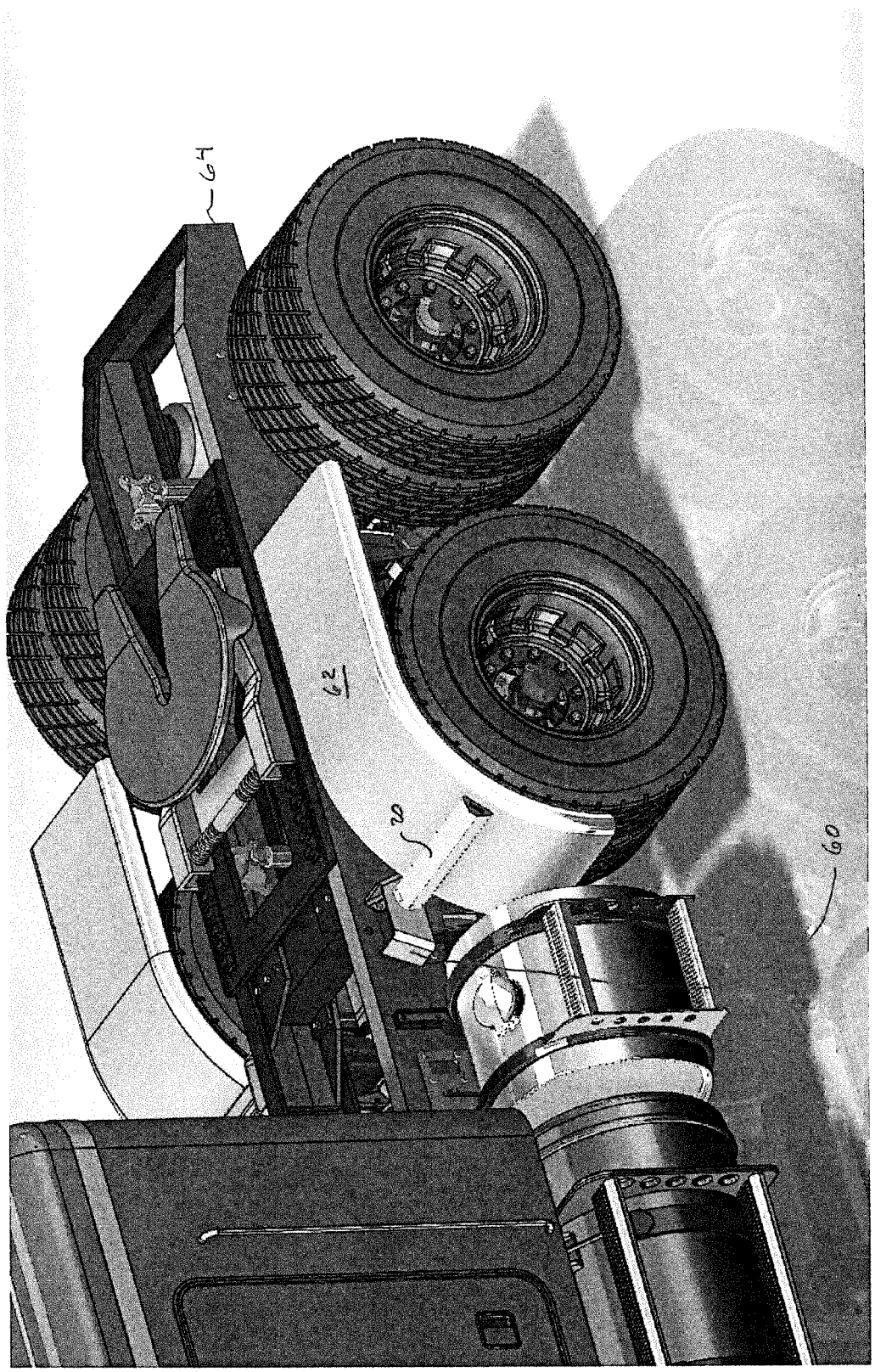
FIG. 6 is a front perspective view of the fender mounting arm of FIG. 2 secured to a truck frame by a bracket so that a half tandem fender is installed.

In an alternative embodiment, illustrated in FIG. 6, the arm 20 may be used in cooperation with a bracket 60 to mount a half tandem fender 62 to a truck frame 64. More specifically, with reference to FIG. 6, a bracket 60 is bolted to the truck frame 64. The bracket could be secured to the truck frame using an alternative fastening arrangement, such as welding or a different type of fastener. The bracket includes a central plate portion with an opening which receives the threaded shaft of the bolt (36 in FIG. 2) of the fender mounting arm 20. The bracket is shaped so as to provide a space between the central plate portion and the truck frame so that a nut (42 in FIG. 2) may be installed onto the threaded shaft of the bolt and tightened. The arm 20 is secured to the fender 62 in the manner described above for the quarter fender 16 of FIG. 3. As a result, the half tandem fender 62 is secured to the truck frame 64.

Figure 7:
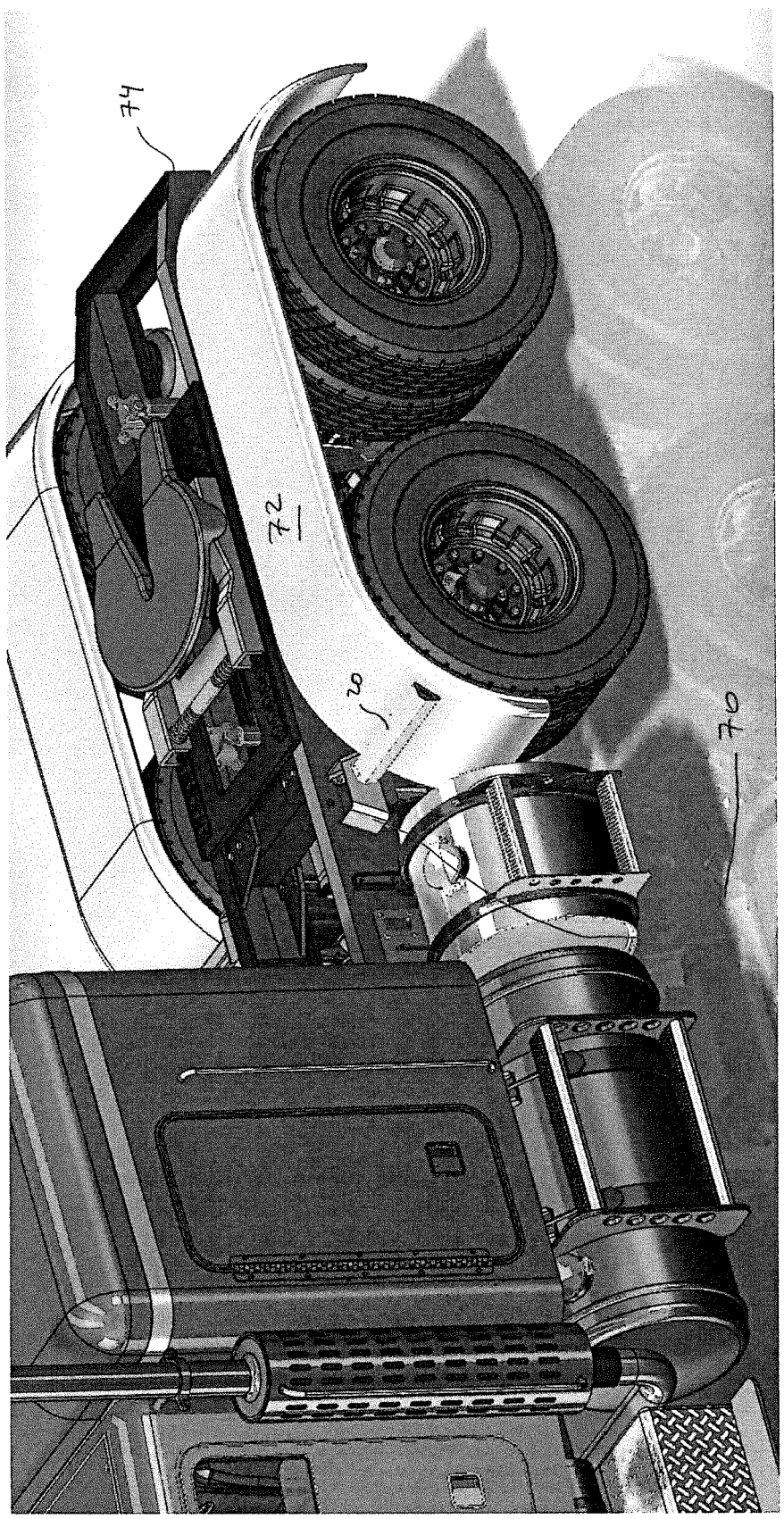
FIG. 7 is a front perspective view of the fender mounting arm of FIG. 2 secured to a truck frame by a bracket so that a full tandem fender is installed.

In the embodiment illustrated in FIG. 7, the arm 20 is used in cooperation with the bracket 70 to mount a full tandem fender 72 to the truck frame 74. More specifically, with reference to FIG. 7, the bracket 70 is bolted to the truck frame 74. The bracket could be secured to the truck frame using an alternative fastening arrangement, such as welding or a different type of fastener. The bracket includes a central plate portion with an opening which receives the threaded shaft of the bolt (36 in FIG. 2) of the fender mounting arm 20. The bracket is shaped so as to provide a space between the central plate portion and the truck frame so that a nut (42 in FIG. 2) may be installed onto the threaded shaft of the bolt and tightened. The arm 20 is secured to the fender 72 in the manner described above for the quarter fender 16 of FIG. 3. As a result, the full tandem fender 72 is secured to the truck frame 74.

As noted previously, the half and full tandem fenders of FIGS. 6 and 7 may alternatively be attached to a truck frame using the fender mounting arm 20 in the matter illustrated, and described with reference to, FIGS. 3-5.

While the preferred embodiments of the invention have been shown and described, it will be apparent to those skilled in the art that changes and modifications may be made therein without departing from the spirit of the invention, the scope of which is defined by the following claims.

What is claimed is:

1. An arm for mounting a fender to a vehicle comprising:
a shell defining an internal channel and featuring a proximal end portion and a distal end portion;
a mounting plate secured within the internal channel in the proximal end portion of the shell, said mounting plate including a fastener opening; and
said distal end portion of the shell adapted to be fastened to the fender;
wherein the shell includes a center panel, a pair of wing panels attached to opposing sides of the center panel and a pair of inwardly turned flange panels attached to the wing panels.

2. The arm of claim 1 further comprising a primary mounting fastener adapted to engage the fastener opening of the mounting plate and the vehicle.

3. The arm of claim 2 wherein the primary mounting fastener is a bolt.

4. The arm of claim 1 wherein the shell generally features a truncated triangular shape.

5. The arm of claim 1 wherein the flange panels feature opposing edges that are spaced so that a longitudinal slot is formed to permit a tool to access the internal channel.

6. The arm of claim 5 further comprising a primary mounting bolt adapted to engage the fastener opening of the mounting plate and the vehicle.

7. The arm of claim 6 wherein the flange panels include fender fastening openings that are engaged by fender fasteners to secure the fender to the arm.

8. The arm of claim 1 wherein the flange panels include fender fastening openings that are engaged by fender fasteners to secure the fender to the arm.

9. The arm of claim 8 wherein the fender fasteners are screws.

10. A fender assembly for a vehicle comprising:
a. an arm for mounting a fender to a vehicle including:
i) a shell defining an internal channel and featuring a proximal end portion and a distal end portion;
ii) a mounting plate secured within the internal channel in the proximal end portion of the shell, said mounting plate including a fastener opening;
b. a fender attached to the distal end portion of the shell;

wherein the shell includes a center panel, a pair of wing panels attached to opposing sides of the center panel and a pair of inwardly turned flange panels attached to the wing panels.

11. The fender assembly of claim 10 further comprising a primary mounting fastener adapted to engage the fastener opening of the mounting plate and the vehicle.

12. The fender assembly of claim 11 wherein the primary mounting fastener is a bolt.

13. The fender assembly of claim 10 wherein the shell generally features a truncated triangular shape.

14. The fender assembly of claim 10 wherein the flange panels feature opposing edges that are spaced so that a longitudinal slot is formed to permit a tool to access the internal channel.

15. The fender assembly of claim 14 further comprising a primary mounting bolt adapted to engage the fastener opening of the mounting plate and the vehicle.

16. The fender assembly of claim 10 wherein the flange panels include fender fastening openings that are engaged by fender fasteners to secure the fender in abutment with the flange panels.

17. A fender assembly for a vehicle comprising:

a. an arm for mounting a fender to a vehicle including:

i) a shell defining an internal channel and featuring a proximal end portion and a distal end portion;

ii) a mounting plate secured within the internal channel in the proximal end portion of the shell, said mounting plate including a fastener opening;

b. a fender attached to the distal end portion of the shell;

further comprising a bracket having a bracket opening, said bracket adapted to be secured to the vehicle, and a primary mounting fastener adapted to engage the fastener opening of the mounting plate and the bracket opening of the bracket.

18. The fender assembly of claim 10 wherein the fender is selected from the group consisting of a half tandem fender, a full tandem fender, a quarter fender and a single axle fender.

* * * * *